(12) United States Patent
Pandey et al.

(10) Patent No.: US 10,908,987 B1
(45) Date of Patent: Feb. 2, 2021

(54) HANDLING MEMORY ERRORS IN COMPUTING SYSTEMS

(71) Applicant: Amazon Technologies, Inc., Seattle, WA (US)

(72) Inventors: Amit Pandey, Austin, TX (US); Ron Diamant, Albany, CA (US)

(73) Assignee: Amazon Technologies, Inc., Seattle, WA (US)

( * ) Notice: Subject to any disclaimer, the term of this patent is extended or adjusted under 35 U.S.C. 154(b) by 13 days.

(21) Appl. No.: 16/367,645

(22) Filed: Mar. 28, 2019

(51) Int. Cl.
*G06F 11/00* (2006.01)
*G06F 11/10* (2006.01)
*G06F 3/06* (2006.01)

(52) U.S. Cl.
CPC ........ *G06F 11/1004* (2013.01); *G06F 3/0619* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 9,384,857 | B2 * | 7/2016 | Wolpert | G11C 29/38 |
| 10,515,049 | B1 * | 12/2019 | Fleming | G06F 12/08 |
| 2010/0287436 | A1 * | 11/2010 | Lastras-Montano | H04W 28/04 714/752 |
| 2014/0331207 | A1 * | 11/2014 | Sridharan | G06F 11/34 717/124 |
| 2015/0318060 | A1 * | 11/2015 | Wolpert | G06F 11/0754 714/719 |
| 2019/0102251 | A1 * | 4/2019 | Iyigun | G06F 11/1068 |

OTHER PUBLICATIONS

D. Montezanti, A. De Giusti, M. Naiouf, J. Villamayor, D. Rexachs and E. Luque, "A Methodology for Soft Errors Detection and Automatic Recovery," 2017 International Conference on High Performance Computing & Simulation (HPCS), Genoa, 2017, pp. 434-441, doi: 10.1109/HPCS.2017.71. (Year: 2017).*

\* cited by examiner

*Primary Examiner* — Daniel F. McMahon
(74) *Attorney, Agent, or Firm* — Weaver Austin Villeneuve &. Sampson LLP

(57) ABSTRACT

An error handling technique for a computing device includes detecting a memory error during execution of the program instructions to generate a computational result, and generating an error message containing information about the memory error. The error message can be stored in a notification memory space, and be made available for access, for example, by a host system. The execution of the program instructions is allowed to continue to generate the computational result despite detecting the memory error. When the computation result becomes available, a confidence level of the computational result can be determined based on which program instruction or which computational stage resulted in the memory error. The confidence level can be used to assess whether the computational result is acceptable.

20 Claims, 8 Drawing Sheets

| Error Type 402 | Memory Index 404 | Instruction Counter 406 | Comp. Layer 408 | Timestamp 410 |

FIG. 4

| Uncorrectable Error Mask 502 |
| Correctable Error Mask 504 |
| Uncorrectable Error Status 512 |
| Correctable Error Status 514 |
| Uncorrectable Error Count 522 |
| Correctable Error Count 524 |

FIG. 5

HANDLING MEMORY ERRORS IN COMPUTING SYSTEMS

BACKGROUND

Errors in semiconductor devices can occur for various reasons. A defect or improper operating condition (e.g., voltage, temperature, etc.) can cause a read or a write to a memory to fail. Soft errors can also occur when particles interact with the semiconductor device. For example, an alpha particle (e.g., from cosmic rays), which carries a positive charge and kinetic energy, can hit a memory cell and cause the cell to change state to a different value. When an alpha particle interacts with the semiconductor substrate, electron-hole pairs can be generated. The resulting electric field in the depletion region may cause a charge drift and create a current disturbance. If the charge displacement overcomes the charge threshold stored in the memory cell defining the logic value of the memory cell, the stored data may flip polarity to cause an error when the data is read. Although the stored data changes value, the atomic reaction does not damage the physical structure of the memory. As such, if the data is rewritten, the memory circuit can recovery from the error and operate properly.

BRIEF DESCRIPTION OF THE DRAWINGS

Various embodiments in accordance with the present disclosure will be described with reference to the drawings, in which:

FIG. 4 illustrates an example of an error notification;

FIG. 5 illustrates examples of various registers used by an error handling technique;

DETAILED DESCRIPTION

Figure 1:
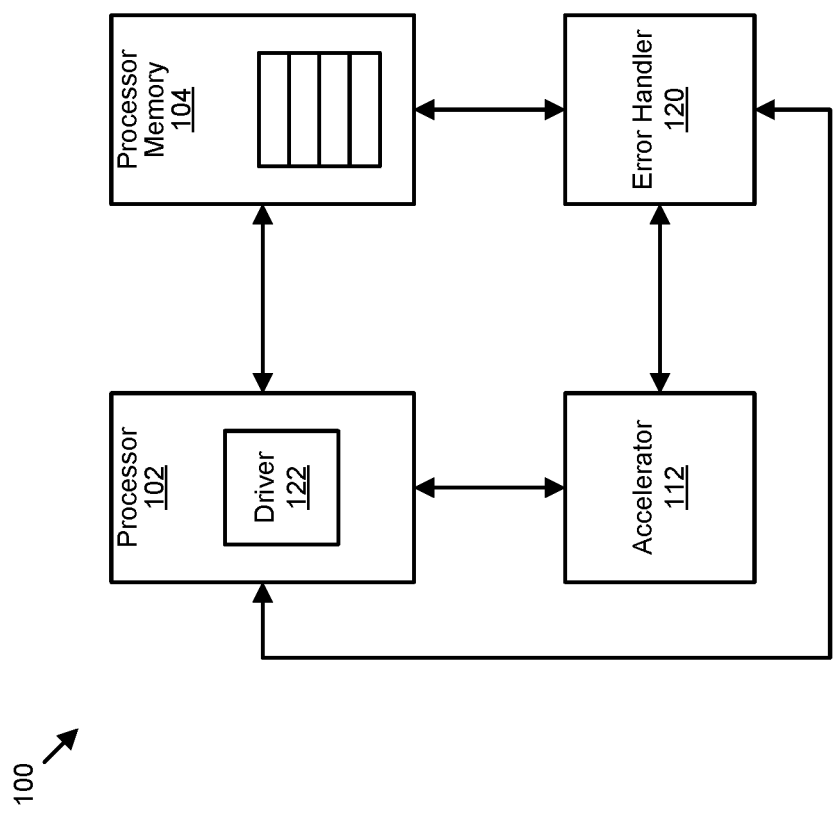
FIG. 1 illustrates a block diagram of an example of a computing system.

Memory errors occurring in a computing system may require the system to be rebooted to recover from the error. If a memory error is detected, the computing system can halt execution of the normal program code to perform error handling procedures. In case of soft errors, the error handling procedures may involve rewriting the correct data in place of the erroneous data. Once the correct data has been rewritten, the computing system may continue to operate properly. Highly reliable systems can use error correction codes to determine the correct data to rewrite to the memory. However, if there are many bit errors, it may not be possible to recover the correct data using an error correction code. When such an uncorrectable error occurs, the system may need to be reset to continue execution. Implementing error correction codes can also be computationally expensive for large memory systems, and may increase the size and cost of the system. In any event, memory errors can disrupt the normal operation of the computing system, and cause delay or interfere with the completion of tasks performed by the computing system.

In order to mitigate against computational delays and prevent a system from halting due to a memory error, an error handling technique can be implemented to allow execution of program instructions to continue despite detecting a memory error. This technique can be especially useful in systems that are trained through machine learning because intermediate errors may have little or no effect on the resulting output. One example of such a system can be a neural network in which computational results are generated from a series of computational layers or stages. A memory error occurring at an early stage may be inconsequential, because subsequent computational stages may filter out the erroneous data. By allowing execution to continue in the event of detecting a memory error, the impact of the memory error on the execution speed of the system can be minimized. When the computations are complete and the results are generated, the error management technique can determine a confidence level of the results based on which computational layer or stage that the memory error occurred in. For example, an error occurring in a deeper layer closer to the output may reduce the confidence level by a greater amount than an error occurring in a prior layer. If the confidence level is sufficient, the system can accept the computational results and continue with the next set of computations such that system throughput is not adversely affected by the memory error.

Although the system is allowed to continue execution in the event of detecting a memory error, the error handling technique can still generate an error notification for each detected error and store the error notification in a notification memory space. This allows the system to become aware of each memory error for debug purposes. The error notification may include information about the nature of a memory error, such as a timestamp of when the error occurred, a memory index associated with the memory location of the error, and information that can be used to determine which computational layer resulted in the memory error (e.g., a program instruction counter or a neural network layer identifier).

In some implementations, the number of detected errors can also be monitored such that an unusually large number of detected errors can be flagged. Unlike sporadic intermittent errors, an unusually large number of errors may indicate a more critical failure that may warrant immediate attention. When a large number of errors above an error threshold are detected during a certain time interval, the error handling technique may generate an interrupt to alert the system. When this occurs, the system may decide to stop execution of the normal program code and take corrective actions to address the sudden memory error burst. This mechanism can improve the robustness of the system because corrective actions can be taken immediately for critical errors, while the impact of tolerable sporadic errors on system performance is minimized.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates a block diagram of an example of a computing system 100. Computing system 100 may include a processor 102, a processor memory 104, and an accelerator 112, which is an integrated circuit device that can accelerate certain operations or computations performed by computing system 100. Computing system may also include an error handler 120 that contains circuitry to manage and monitor memory errors in computing system 100. In various examples, computing system 100 can be implemented as a server in a data center, a desktop computer, a laptop computer, a tablet computer, or a smartphone, among other examples.

Processor 102 is an integrated circuit device that can execute program code, in the form of instructions. The program code can be for various software applications or tools, such as an operating system and/or the illustrated driver 106, etc. While processor 102 is executing a program, the instructions for the program can be stored in the processor memory 104. The instructions can also be stored elsewhere, such as on a storage device, and can be loaded into the processor memory 104 when needed by processor 102. Processor 102 can also use processor memory 104 for temporary storage of other data on which processor 102 is operating. In various examples, processor memory 104 can be a volatile memory type, such as a type of Random Access Memory, though non-volatile memory types can, alternatively or additionally, be used for processor memory 104.

Accelerator 112 can be a type of peripheral device or I/O device that is purpose built to perform certain operations faster than that can be otherwise performed by processor 102. For example, accelerator 112 can be a neural network accelerator, and, as such, may be able to perform the large scale, parallel computations of a neural network more efficiently and quickly than when the computations are performed by processor 102. As another example, accelerator 112 can be a graphics processing unit (GPU), and may be optimized to perform the computations needed for graphics rendering. Other examples of devices that can be implemented by accelerator 112 include cryptographic accelerators, compression and decompression accelerators, 3-D accelerators, regular expression accelerators, security accelerators, and others.

In various examples, accelerator 112 can execute program code to perform certain operations. For example, when accelerator 112 is a neural network accelerator, accelerator 112 can be programmed to execute a particular neural network, such as one that performs image recognition or one that performs machine translation. As a further example, to support the execution of a neural network, accelerator 112 can be programmed to perform operations such as copying data for the neural network from processor memory 104 (for example) into accelerator 112, copying input data for the neural network from processor memory 104 into accelerator 112, and/or copying results from accelerator 112 into the processor memory 104, among other examples.

In the example of FIG. 1, computing system 100 can execute a driver 122 (may also be referred to as a device driver or runtime driver) that manages accelerator 112. Driver 122 can provide an interface between applications executing on computing system 100 (or on another host system) and accelerator 112. For example, driver 122 can provide an Application Program Interface (API) that defines functions for feeding input data to accelerator 112 and defining the operation to perform on the input data. In this and other examples, driver 122 can configure accelerator 112 to perform the operation. For example, driver 122 can identify a neural network that accelerator 112 is to execute, as well as the location in processor memory 104 where data for the neural network is located. Driver 122 can load or cause accelerator 112 to load the input data on which the neural network is to operate, and/or can cause accelerator 112 execute computations on the input data. Once accelerator 112 has finished the computations, accelerator 112 can notify driver 122, and driver 122 can deliver a result back to the application that requested the result.

Error handler 120 may include error management and monitoring circuitry to improve system performance and robustness when memory errors occur in computing system 100. Error handler 120 may detect and monitor memory errors in processor memory 104. In some implementations, error handler 120 may alternatively or additionally detect and monitor memory errors in the memory subsystem of accelerator 112. Although shown as a separate component, error handler 120 can be integrated as part of a memory or as part of accelerator 112.

During execution of program code or instructions by processor 102 and/or accelerator 112, error handler 120 may detect a memory error using an error detection mechanism. When a memory error is detected, error handler 120 may suppress the generation of an interrupt to prevent execution of the current program from halting due to the memory error, and allow the execution to continue despite detecting the memory error. Error handler 120 may also generate an error notification and store the error notification in a notification memory space. When execution of the current program is complete (e.g., when a set of computational results become available), a confidence level of the computational results can be determined to provide an assessment of the impact of the memory error on the computational results. If the computational results are acceptable, processor 102 and/or accelerator 112 can move on and execute the next program or task. If the confidence level is too low, error handler 120 may instruct processor 102 and/or accelerator 112 to reset and re-execute the current program.

Error handler 120 may also include a counter that counts a cumulative number of memory errors detected, and compare it to a certain configurable error threshold. The counter can be periodically reset to zero such that the cumulative number of memory errors is determined over a periodic time interval. The cumulative number of memory errors can also be determined over a sliding time window to detect any sudden burst of memory errors. When the cumulative number of memory errors detected exceeds the error threshold, an interrupt can be generated to processor 102 and/or accelerator 112 to alert the system of a potential critical error. Additional details of the error handling mechanism will be described further below.

Figure 2:
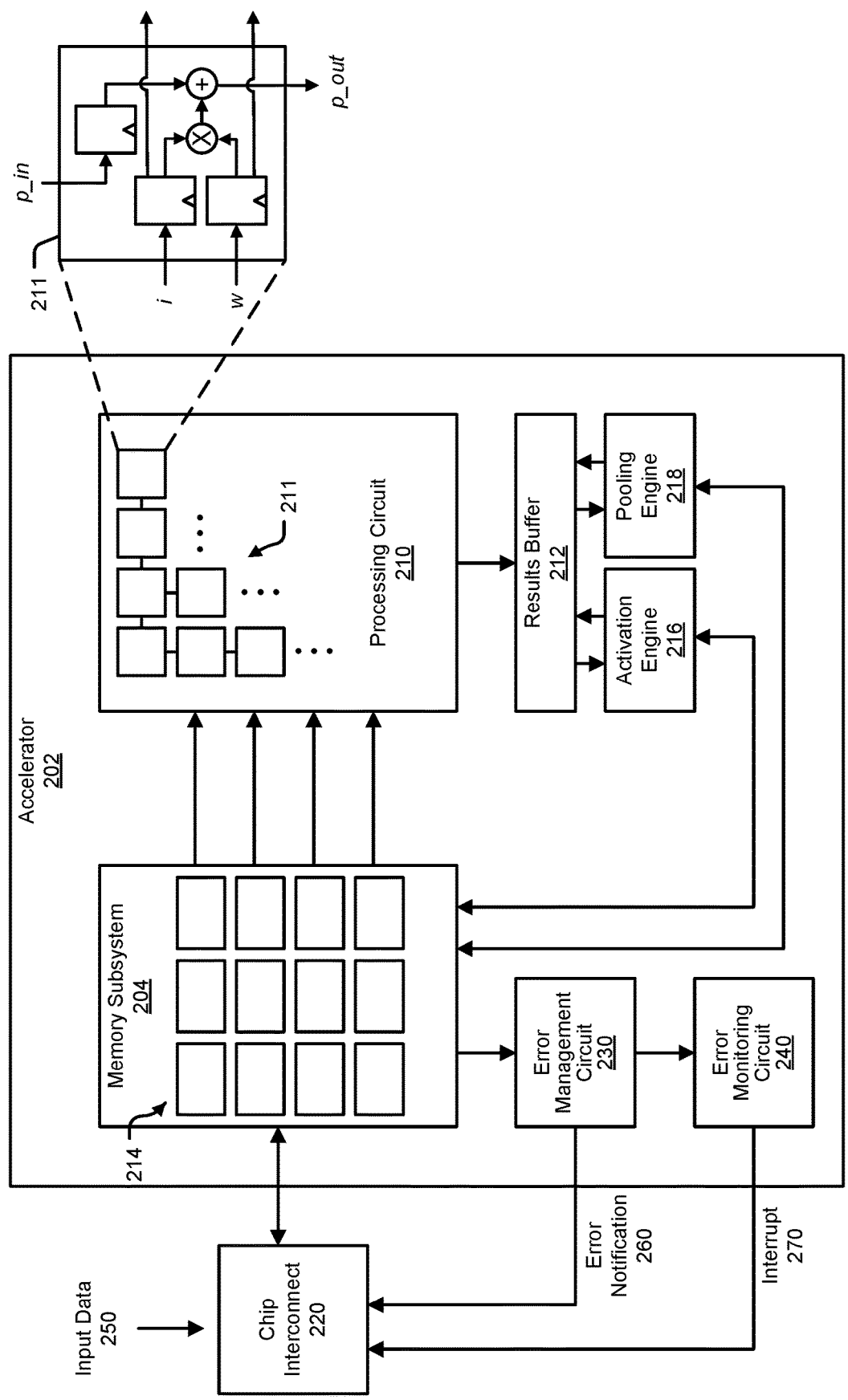
FIG. 2 illustrates a block diagram of an example of an integrated circuit device.

FIG. 2 illustrates a block diagram of an example of an integrated circuit device that may include error handler circuitry to manage memory errors. The example of FIG. 2 illustrates an accelerator 202. Accelerator 202 can execute computations for a set of input data (e.g., input data 250) using a processing circuit 210, an activation engine 216, and/or a pooling engine 218. In some implementations, accelerator 202 can be an integrated circuit component of a processor, such as a neural network processor, graphics processor, etc. The processor may have other integrated circuit components, including additional accelerator engines. In other implementations, the components of accelerator 202 can be an integrated circuit component of other elements of a computing or host system such as a peripheral or I/O device.

In various implementations, the memory subsystem 204 can include multiple memory banks 214. Memory banks 214 can be implemented, for example, using static random access memory (SRAM) or other suitable types of semiconductor memory. Each memory bank 214 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 214. For example, each memory bank can be a physically separate memory component having an address space that is separate and independent of the address spaces of the other memory banks. Each memory bank may have at least one read channel and may have at least one separate write channel that can be used at the same time. In these examples, memory subsystem 204 can permit simultaneous access to the read or write channels of multiple memory banks. As another example, memory subsystem 204 can include arbitration logic such that arbitration between the outputs of multiple memory banks 214 can result in more than one memory bank's output being used. In these and other examples, though globally managed by memory subsystem 204, each memory bank can be operated independently of any other.

Having memory banks 214 be independently accessible can increase the efficiency of accelerator 202. For example, processing circuit 210 may implement a processing engine array of computational blocks, and values can be simultaneously read and provided to each row of the processing engine array, so that the entire processing engine array can be in use in one clock cycle. As another example, memory banks 214 can be accessed at the same time such that results computed by the processing engine array are written to memory subsystem 204. In contrast, a single memory may be able to service only one read or write at a time. With a single memory, multiple clock cycles may be required to read input data for each row of the processing engine array before computations can be started.

In various implementations, memory subsystem 204 can be configured to simultaneously service multiple clients, including processing circuit 210, activation engine 216, pooling engine 218, and any external clients that access memory subsystem 204 over a chip interconnect 220 being utilized as communication fabric. In some implementations, being able to service multiple clients can mean that memory subsystem 204 has at least as many memory banks as there are clients. In some cases, each row of the processing engine array or processing circuit 210 can count as a separate client. In some cases, each column of the processing engine array can output a result, such that each column can count as a separate write client. In some cases, output from processing engine array 210 can be written into memory banks 214, and the written data can be subsequently provided as input data for the next set of computations to be performed by the processing engine array. As another example, activation engine 216 and pooling engine 218 can include multiple execution channels, each of which can be separate memory clients.

In various implementations, memory subsystem 204 can include control logic. The control logic can, for example, keep track of the address spaces of each of memory banks 214, identify memory banks 214 to read from or write to, and/or move data between the memory banks 214. In some implementations, memory banks 214 can be hardwired to particular clients. For example, a set of memory banks 214 can be hardwired to provide values to the rows of the processing engine array of processing circuit 210, with one memory bank servicing each row. As another example, a set of memory banks can be hardwired to receive values from columns of the processing engine array, with one memory bank receiving data for each column.

Processing circuit 210 may include a processing engine array implementing the computation matrix of accelerator 202. The processing engine array can, for example, execute parallel integration, convolution, correlation, and/or matrix multiplication, among other things. Processing circuit 210 may include multiple processing engines 211, arranged in rows and columns, such that results output by one processing engine 211 can be input directly into another processing engine 211. Processing engines 211 that are not on the outside edges of the processing engine array can thus receive data to operate on from other processing engines 211, rather than from memory subsystem 204.

In various implementations, processing circuit 210 may use systolic execution, in which data arrives at each processing engine 211 from different directions at regular intervals. For example, input data can flow into the processing engine array from the left and weight values can be loaded at the top. In some examples, weights and input data can flow from the left and partial sums can flow from top to bottom. In these and other examples, a multiply-and-accumulate operation moves through the processing engine array as a diagonal wave front, with data moving to the right and down across the array. Control signals can be input at the left at the same time as weights, and can flow across and down along with the computation.

The number of columns in the processing engine array of processing circuit 210 can determine the computational capacity of the processing engine array, and the number of rows can determine the required memory bandwidth for achieving maximum utilization of the processing engine array. The processing engine array can have, for example, 64 columns and 428 rows, or some other number of columns and rows.

An example of a processing engine 211 is illustrated in FIG. 2 in an inset diagram. As illustrated by this example, processing engine 211 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 211.

In the illustrated example, an input from above can include a partial sum, p_in, provided either from another processing engine 211 or from a previous round of computation by the processing engine array. When starting a computation for a new set of input data, the top row of the processing engine array can receive a fixed value for p_in, such as zero. As illustrated by this example, i and w are multiplied together and the result is summed with p_in to produce a new partial sum, p_out, which can be used as the input into another processing engine 211. Various other implementations of the processing engine 211 are possible.

Outputs from the last row in the processing engine array of processing circuit 210 can be temporarily stored in the results buffer 212. The results can be intermediate results, which can be written to memory banks 214, and be provided back to the processing engine array as inputs for additional computations. Alternatively, the results can be final computational results. Once the final computational results are written to memory banks 214, the results can be read from memory subsystem 204 over the chip interconnect 220 to be output by the system.

In some implementations, accelerator 202 can include an activation engine 216. Activation engine 216 can combine the results from the processing engine array of processing circuit 210 into one or more output activations. For example, for a convolutional neural network, convolutions from multiple channels can be summed to produce an output activation for a single channel. In other examples, accumulating results from one or more columns in the processing engine array may be needed to produce an output activation for a single node in the neural network. In some implementations, activation engine 216 can be bypassed.

In various examples, activation engine 216 can include multiple separate execution channels. In these examples, the execution channels can correspond to the columns of the processing engine array of processing circuit 210, and can perform an operation on the outputs of a column, the result of which can be stored in memory subsystem 204. For example, activation engine 216 may be able to perform between 1 and n parallel computations, where n is equal to the number of columns in the processing engine array. In some cases, one or more of the computations can be performed simultaneously. Examples of computations that each execution channel can perform include exponentials, squares, square roots, identities, binary steps, bipolar steps, sigmoidals, and ramps, among other examples.

Accelerator 202 can also include a pooling engine 218. Pooling refers to the combining of outputs of the columns of the processing engine array 210. Pooling can be used, for example, to compute a maximum value, a minimum value, an average value, a median value, a summation, a multiplication, or another logical or mathematical combination. In various examples, pooling engine 218 can include multiple execution channels that can operating on values from corresponding columns of the processing engine array. In these examples, pooling engine 218 may be able to perform between 1 and n parallel computations, where n is equal to the number of columns in the processing engine array. In various examples, execution channels of pooling engine 218 can operate in parallel and/or simultaneously. In some implementations, pooling engine 218 can be bypassed.

As used herein, an execution engine may refer to activation engine 216 and/or pooling engine 218. An execution engine may also refer to the processing engine array of processing circuit 210. Another example of an execution engine can be a Direct Memory Access (DMA) engine, which may be located outside accelerator 202.

Input data 250 can arrive over chip interconnect 220 implementing a communication fabric. Chip interconnect 220 can connect accelerator 202 to other components of a processor, such as a DMA engine that can obtain input data 250 from an Input/Output (I/O) device, a storage drive, or a network interface. The input data 250 can be, for example one-dimensional data, such as a character string or numerical sequence, or two-dimensional data, such as an array of pixel values for an image or frequency and amplitude values over time for an audio signal. In some examples, the input data 250 can be three-dimensional, as may be the case with, for example, the situational information used by a self-driving car or virtual reality data. In some implementations, the memory subsystem 204 can include a separate buffer for the input data 250. In some implementations, the input data 250 can be stored in memory banks 214 when accelerator 202 receives the input data 250.

In some examples, accelerator 202 can implement a neural network processing engine. In these examples, accelerator 202, for a set of input data 250, can execute a neural network to perform a task for which the neural network was trained. Executing a neural network on a set of input data can be referred to as inference or performing inference.

The weights for the neural network can be stored in memory subsystem 204, along with input data 250 on which the neural network will operate. The neural network can also include instructions, which can program processing engine array 210 to perform various computations on the weights and the input data. The instructions can also be stored in memory subsystem 204, in memory banks 214, or in a separate instruction buffer. The processing engine array of processing circuit 210 can output intermediate results, which represent the outputs of individual layers of the neural network. In some cases, activation engine 216 and/or pooling engine 218 may be enabled for computations called for by certain layers of the neural network. The accelerator 202 can store the intermediate results in memory subsystem 204 for inputting into the processing engine array to compute results for the next layer of the neural network. The processing engine array or processing circuit 210 can further output final results from a last layer of the neural network. The final results can be stored in memory subsystem 204 and then be copied out to host processor memory or to another location. Each layer of the neural network can be an example of a computational stage or computational layer used to generate the final computational results.

Accelerator 202 may also include error handling circuitry such as error management circuit 230 and error monitoring circuit 240 to handle memory errors of memory subsystem 204. Error management circuit 230 may include an error detection mechanism to detect memory errors in memory subsystem 204. For example, the error detection mechanism can be parity protection (e.g., parity check) that involves computing a parity bit over a set of data bits (e.g., a memory word, etc.). For large memory sizes, parity protection can be much more cost effective in terms of computational logic and storage requirements than more complex mechanisms such as error correction codes. However, parity protection does not provide correction capability and can only be used to detect the presence of a memory error. As such, each memory error detected using parity protection is considered an uncorrectable error.

In some implementations, the error detection mechanism can alternatively utilize an error correction code (ECC) if implementing such is acceptable. Similar to parity protection, ECC involves computing a value (i.e. the error correction code) over a set of data bits. ECC can allow the system to automatically correct memory errors on the fly. For example, if there is only a single bit error in the set of data bits, the ECC can be used to recover the correct data, and the correct data can be rewritten back to the memory to correct a soft error fault. For multi-bit errors, the error correction code can be used to detect the error but not recover the correct data. In the aforementioned example, a single bit error detected using ECC can be referred to as a correctable error, and a multi-bit error detected using ECC can be referred to as an uncorrectable error. It should be noted that some ECC implementations can be used to correct multiple bit errors. In such cases, an error having the number of error bits up to the correction capability of the ECC is considered a correctable error, and an error having the number of error bits greater than the correction capability of the ECC is considered uncorrectable. As compare to parity protection, ECC requires more storage to store the multi-bit code and more complex logic to perform the error check and data recover computations.

When error management circuit 230 detects an uncorrectable memory error, instead of generating an interrupt to halt execution of the current program code, error management circuit 230 may suppress the interrupt and allow execution of the current program code to continue until processing circuit 210 outputs the final computational results. Thus, error management circuit 230 can prevent execution of the program code from halting due to the memory error. This can allow accelerator 202 to maintain maximum throughput despite the presence of memory errors. For a correctable memory error (e.g., in ECC implementations), error management circuit 230 may also suppress the error correction process and allow the computations to continue without correcting the memory error to maintain maximum throughput. In some implementations, the functionality to suppress the interrupt and/or suppress the error correction process can be independently configurable such that these capabilities can be enabled or disabled, depending, for example, on the end-user application.

To make a host system aware of the memory errors, error management circuit 230 can generate, for each detected memory error, an error message such as an error notification 260 containing information about the corresponding error. For example, error notification 260 may include one or more of the following information: the type of error detected (e.g., correctable or uncorrectable), a memory index or a memory location indicating the location of the error in memory subsystem 204, an instruction or program counter indicating which instruction was being executed when the error occurred, computational layer information indicating which computation layer or stage that the error occurred in, and/or a timestamp indicating the time of the error. Error notification 260 can be stored in a notification memory space. For example, error management circuit 230 may provide error notification 260 to chip interconnect 220 for writing to a notification storage memory that is external to memory subsystem 204 such as DRAM or disk storage. In some implementations, a memory region in memory subsystem 204 can alternatively be used as the notification memory space.

When execution of the current program code completes and the final computational results have been written to memory subsystem 204, error management circuit 230 can determine a confidence level of the computational results based on the nature of the detected memory errors. In implementations in which the computation results are generated through a series of computational stages or computational layers such as a neural network, a memory error occurring at different computational stages may have a different impact on the confidence level of the computational results.

In some cases, an error occurring in an early computational stage may have less impact on the confidence level of the computational results than a memory error occurring in a later computational stage. By way of example, the confidence level can be 100% if no errors are detected, 99.9% if a memory error is detected in the $1^{st}$ layer, 96.3% if a memory error is detected in the $7^{th}$ layer, etc. In some implementations, if multiple errors are detected in different layers, the confidence level percentage of the different layers can be combined (e.g., multiplied, averaged, weighted average, etc.) to derive the confidence level of the final computational results. By way of illustration following the above example, if a memory error is detected in both the $1^{st}$ and $7^{th}$ layer, the confidence level can be 96.2% (which is the result of 99.9%×96.3%). The confidence level percentage of multiple errors detected in the same computational layer can be combined in a similar manner, or in some implementations, errors occurring in the same computational layer is only take into account once when determining the confidence level.

The confidence level impact of each computational layer can be application dependent. In order to determine the confidence level impact associated with each layer, the system can perform an initialization phase in which a memory bit at each layer is flipped at random, and computations are carried out on a set of test data. The computational results with a random flipped bit can be compared with the computational results with no flipped bit to determine a margin of error caused by the flipped bit. This margin of error can then be used to determine the confidence level impact of a particular computational layer. For example, the average or median of the margins of error for different flipped bits in a particular layer can be used to derive the confidence level percentage of that particular layer. When the initialization phase completes, the confidence level percentage of each computation layer can be stored for reference by error management circuit 230 during runtime to determine the confidence level of the computational results. In some implementations, error management circuit 230 can keep a running confidence level that is updated during execution of the program code such that the confidence level can be immediately available at the same time as the final computation results. Alternatively, error management circuit 230 can determine the confidence level after execution of the program code is complete, by retrieving the error notifications to determine which computational layer had memory errors.

The confidence level of the computational results can also be dependent on what type of information is being stored at the memory location affected by the memory error. For example, the impact of erroneous computational data or computational weight may be less significant than an erroneous program instruction, because an erroneous program instruction can cause the wrong operation to be performed, whereas erroneous data or weight may only incrementally reduce the accuracy of the computational results. Thus, in some implementations, the memory index or memory location of the memory error can be used to determine what type of information was affected by the memory error, and the information type can be used to further qualify the confidence level percentage of the corresponding memory error.

Error management circuit 230 may then determine, based on the confidence level, whether to accept the one or more computational results or to re-execute the program code. For example, the confidence level of the computational results can be compared with a threshold confidence level to determine whether the results are acceptable. The threshold confidence level can be application dependent. For example, in applications that require high accuracy such as piloting an autonomous vehicle, the threshold confidence level can be set to a high level such as 99% or above. In applications that require less accuracy such as image processing, the threshold confidence level can be set to a lower level such as 80%. If the confidence level of the computational results is below the threshold confidence level, this may indicate that the memory errors had severely impacted the computations, and the system should reset and re-execute the program code to get better results. If the confidence level of the computational results is at or above the threshold confidence level, this may indicate that the memory errors had little impact on the computations, and the system can rely on the computational results despite the presence of memory errors.

In some implementations, the confidence level determination and/or the decision to accept the computation results can be offloaded to a host system. For example, a host system can retrieve the error notifications from the notification memory space to determine which computational layer had memory errors, and calculate the confidence level based on the information in the error notifications stored by error management circuit 230. The host system can then compare the confidence level determined by the host system with a threshold confidence level to determine whether to accept the computational results. As another example, error management circuit 230 can determine the confidence level, and provide the confidence level to the host system to allow the host system to make the decision as to whether to accept the computational results.

With the use of error management circuit 230 to suppress interrupts caused by individual memory errors, there is a risk that a more critical memory failure may remain unnoticed for an extended period of time. In order to alert a host system of a potentially more serious problem, error monitoring circuit 240 can implement a counter to count the number of memory errors detected by error management circuit 230 during execution of the current program code. The counter can be configured to count the number of memory errors detected over a predetermined time interval, and the counter can be reset to zero periodically after the expiration of each time interval to restart the counting process. This mechanism allows error monitoring circuit 240 to detect any burst of memory errors occurring within a short period of time. The time interval can also be implemented as a sliding time window, for example, to detect a burst of memory errors that span the middle of two time periods.

The counter value can be compared with a predetermined error threshold. If the number of errors exceed the error threshold, error monitoring circuit 240 may generate an interrupt 270 to alert the host system of the sudden memory error burst. Such a sudden memory error burst may indicate a more serious failure such as operating the device outside the proper operating conditions. The counter value can be accessible by software for debug purposes (e.g., to inspect how many errors occurred over time). Interrupt 270 may cause the host system to halt execution to investigate the root cause of the error and to take corrective measures. In some implementations, the time interval and the error threshold can be configurable and be tailored to the particular application of the system.

For implementations in which an error correction code is used as the error detection mechanism, error monitoring circuit 240 can maintain separate counters for correctable and uncorrectable errors. Furthermore, the monitoring time interval and error threshold for the two different types of errors can be independently configurable. For example, the system may tolerate a greater number of correctable errors than uncorrectable errors before asserting interrupt 270. As such, the error threshold for correctable errors can be set higher than the error threshold for uncorrectable errors. Error monitoring circuit 240 may also generate separate interrupts for the two different types of errors. This can be useful when implementing different error handling procedures for the two types of errors. For example, a correctable error interrupt may trigger the host system to execute a memory rewrite procedure to write the correct data back to into the erroneous memory locations, whereas an uncorrectable error interrupt may trigger the host system to enter a debug mode.

Figure 3A:
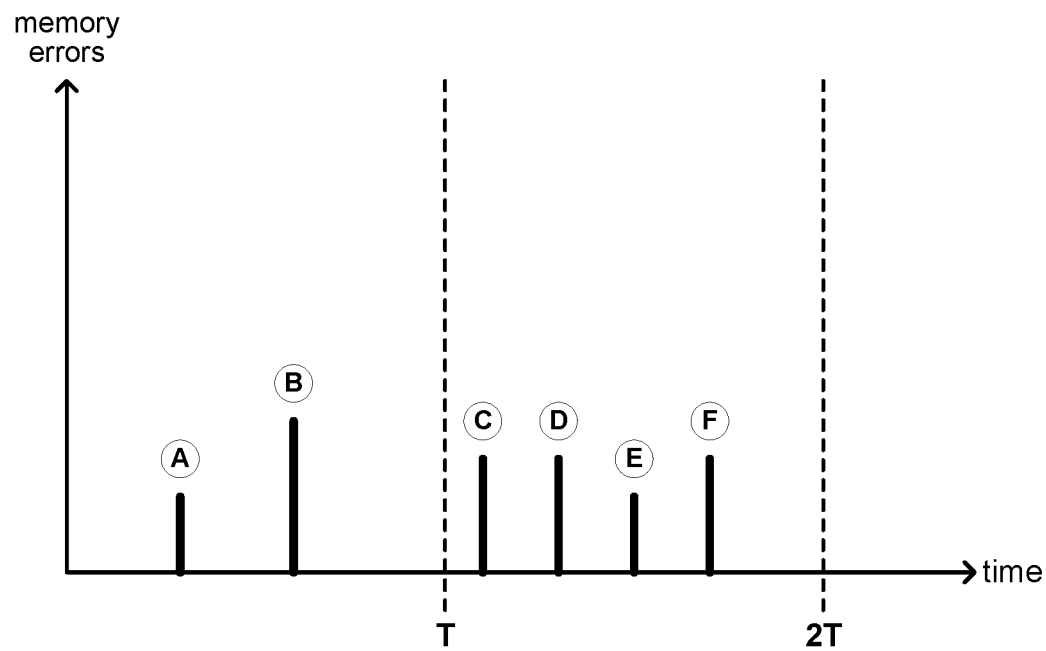
FIG. 3A illustrates an example of a timing diagram showing memory errors being detected overtime.

FIG. 3A illustrates an example of a timing diagram showing memory errors being detected over time. The memory errors can be detected, for example, using error management circuit 230. The duration of time shown in the timing diagram includes two time intervals: a first time interval from time=0 to time=T, and a second time interval from time=T to time=2T. During the first time interval from time=0 to time=T, 2 errors may be detected at event A and 4 errors may be detected at event B. During the second time interval from time=T to time=2T, 3 errors may be detected at event C, 3 errors may be detected at event D, 2 errors may be detected at event E, and 3 errors may be detected at event F.

Figure 3B:
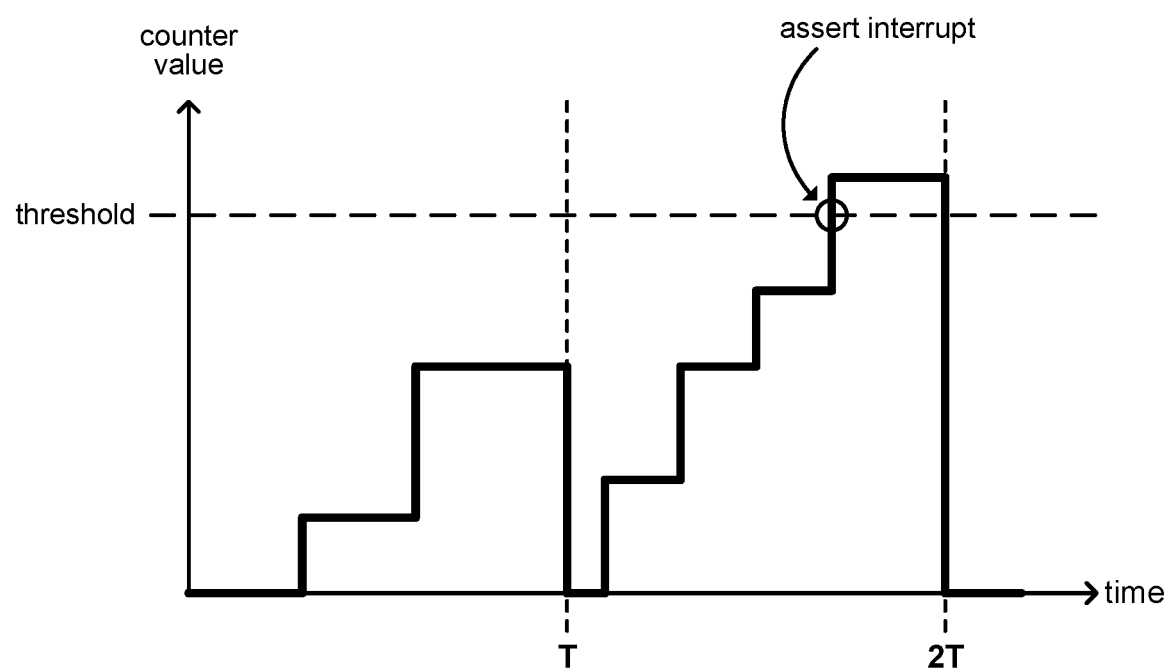
FIG. 3B illustrates an example of the behavior of a counter used for generating an interrupt in response to the memory errors shown in FIG. 3A.

FIG. 3B illustrates an example of a timing diagram showing the behavior of a counter used for generating an interrupt in response to the memory errors shown in FIG. 3A. The counter can be maintained, for example, by error monitoring circuit 240. In the example timing diagram shown in FIG. 3B, the counter can be configured to accumulate or count the number of memory errors over a periodic time interval T. As such, the counter may reset to zero at the end of each time interval (e.g., at time=T, time=2T, etc.). Further, in the example timing diagram shown in FIG. 3B, the error threshold for triggering an interrupt can be set at 10 memory errors.

As shown in FIG. 3B, during the first time interval from time=0 to time=T, the counter value may increment to 2 in response to the 2 errors detected at event A, and then to 6 in response to the 4 additional errors detected at event B. The counter is then reset to zero at time=T. Because the counter value representing the cumulative number of errors detected during this first time interval did not reach the error threshold, no interrupt is generated during this time period.

During the second time interval from time=T to time=2T, the counter value may increment from 0 to 3 in response to the 3 errors detected at event C, and then to 6 in response to the 3 additional errors detected at event D. The counter value may further increment to 8 in response to the 2 errors detected at event E, and then to 11 in response to the 3 additional errors detected at event F. At this point in time, because the counter value representing the cumulative number of errors detected exceeded the error threshold of 10, an interrupt is generated to indicate that a burst of memory errors have been detected during this second time interval. At time=2T, the counter value is reset back to 0.

FIG. 4 illustrates an example of an error notification that can be generate in response to detecting a memory error. The error notification may include an error type 402, a memory index 404, an instruction counter value 406, a computational layer identifier 408, and a timestamp 410, etc. It should be understood that the error notification in some implementations may omit one or more of these data fields, and/or may include other data fields not specifically shown.

Error type 402 can be used to indicate whether the detected error is a correctable error or an uncorrectable error. In implementations in which the error detection mechanism is only parity protection, this field can be omitted because every memory error is considered to be an uncorrectable error.

Memory index 404 can be used to indicate a memory location and/or determine what type of information is being stored at the memory location where the memory error occurred. In some implementations, memory index 404 can identify a memory location such as a memory address or a memory pointer. As mentioned above, the type of information being stored at a memory location can be one of an instruction, computational data, or computational weight (e.g., a weight for a neural network layer). In some cases, specific memory regions or address space can be dedicated for storing a particular type of information, or a mapping between memory index values and the type of stored information can be maintained. As such, the error handling technique can use memory index 404 identify the type of stored information and adjust the confidence level accordingly. Memory index 404 can also be used to identify the memory address associated with the memory error to perform an error correction procedure.

Instruction counter value 406 may represent the value of the program counter indicating which instruction is being executed at the time the memory error is detected. This information can be used to determine at what point during the execution of the program code that the memory error occurred. This information can in turn be used to determine which computational stage or layer that the memory occurred in.

Computational layer identifier 408 may identify which computational stage or layer that the memory occurred in. Computational layer identifier 408 can be used to determine the proper confidence level percentage to apply to the memory error. For example, computational layer identifier 408 can be used to lookup a corresponding confidence level percentage in a mapping table that maps each neural network layer to a confidence level percentage. As mentioned above, institution counter value 406 can be used to determine computational layer identifier 408. As such, in some implementations, either instruction counter value 406 or computational layer identifier 408 can be omitted from the error notification.

Timestamp 410 may indicate the system time when the memory error is detected. In some implementations, this information can be used to determine the rate of memory errors, or be used for other debug purposes. This information can also be used by a host system to prioritize the order in which notifications are processed.

As discussed above, the error notification is stored in a notification memory space for access by a host system (e.g., a host processor). In some implementations, the error notification for the memory error can be stored together with other types of notifications for the host system. The host system may implement a specific format for the notifications. For example, the notification memory space can be implemented as a notification queue, and each notification may be 16-bytes in length. Accordingly, the error notification shown in FIG. 4 can be formatted to conform to the notification format of the host system. In some cases, the error notification may further include flow control bits and a notification type identifier to facilitate processing by the host system.

FIG. 5 illustrates examples of various registers that can be used to facilitate the error handling technique disclosed herein. These registers can be accessible by a host system, and may include an uncorrectable error mask register 502, a correctable error mask register 504, an uncorrectable error status register 512, a correctable error status register 514, an uncorrectable error count register 522, and a correctable error count register 524. In implementations in which only parity protection is employed, the registers relating to correctable errors can be omitted. Error mask registers 502/504 can be used to mask the memory errors of particular memory regions from being included in error count registers 522/524. For example, error mask register 502/504 can include a mask bit for each memory region (e.g., memory block, memory bank, memory partition, etc.) to control whether errors in the corresponding memory region are counted to trigger an interrupt.

Error status registers 512/514 can be used to indicate whether a memory error has been detected for a particular memory region. Error status registers 512/514 can include a status bit for each memory region (e.g., memory block, memory bank, memory partition, etc.) to indicate the detection of a memory error for each region. In some implementations, the setting of error mask registers 502/504 may have no effect on error status registers 512/514. In this manner, a host system can still read error status registers 512/514 to determine whether a memory error occurred in a masked memory region.

Error count registers 522/524 can be used to store a cumulative count of the number of detected memory errors. The count values stored in these registers can be compared with respective error thresholds to determine whether to assert an interrupt to alert a host system of the error condition. In some implementations, the error count registers 522/524 can be reset to zero at periodic intervals such that the memory errors are counter over a specified time interval. In some implementations, the memory errors can be accumulated over a running time window. This can be achieved, for example, by decrementing the count value when a memory error is older than the duration of the specified time interval.

Figure 6:
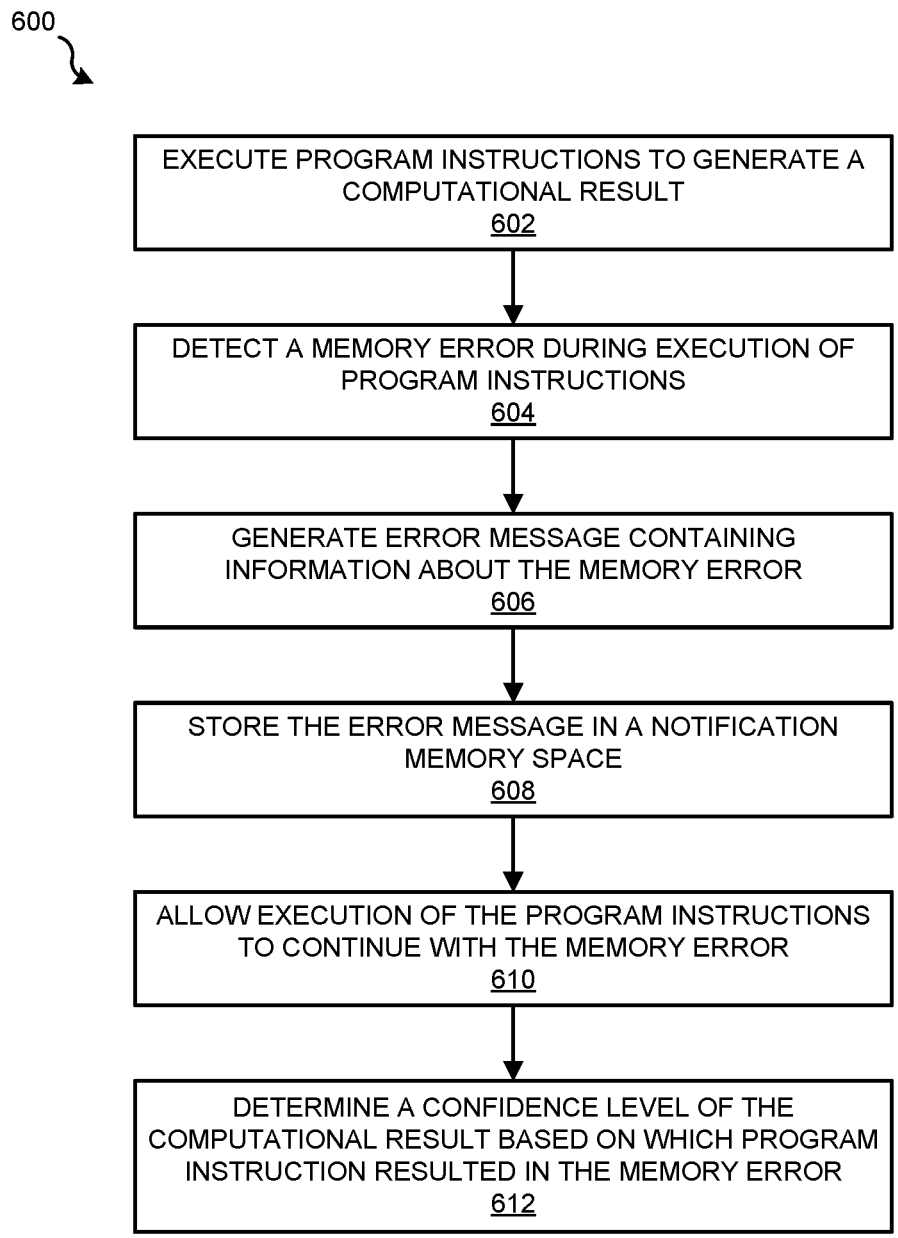
FIG. 6 illustrates a flow diagram of an example of an error handling technique.

FIG. 6 illustrates a flow diagram of an example of an error handling process 600. Error handling process 600 can be used to maximize throughput of a system despite the presence of memory errors. These methods may be implemented by the systems and/or devices described above, such as computing system 100, accelerator 202, etc. Some operations can be performed by error handling circuitry such as error management circuit 230, error monitoring circuit 240, or a combination thereof. Some operations can alternatively be performed by a host system in combination with the error handling circuitry.

Process 600 may begin at operation 602 by executing program instructions or program code to generate a computational result. The program instructions or program code can be executed by a processing unit of an integrated circuit device. The integrated circuit device can be, for example, a processor, an accelerator, or other application specific integrated circuit (ASIC) of a computing system. The processing unit may include a processor circuit (e.g., a processing engine array) and a memory subsystem that includes one or more semiconductor memories (e.g., SRAM, etc.). The program instructions or program code may generate the computational results by performing computations using multiple computation stages or layers (e.g., neural network layer). For example, the computational layers may include a first computation layer that generates computational outputs, and a second computational layer having inputs derived from the computational outputs of the first computation layer. In some implementations, there can be additional computational layer(s) before, between, and/or after the first and second computational layers. The multiple computation layers can be used, for example, to implement a neural network.

At operation 604, a memory error (e.g., a soft error) may be detected during execution of the program instructions or program code. The memory error detection mechanism can be a parity check, an error detection code (ECC), or other data error detection mechanism. In case of parity check, the memory error can be an uncorrectable error. In case of ECC, the memory error can be an uncorrectable error or a correctable error.

At operation 606, in response to detecting the memory error, an error message (e.g., an error notification) containing information about the memory error can be generated. The error message may include various types of information pertaining to the memory error. For example, the error message may include one or more of: an error type indicating whether the memory error is correctable or uncorrectable, a memory index or a memory location indicating where the memory error occurred, information indicating in which computational layer the memory error occurred, a timestamp indicating the system time when the memory error occurred, etc. The information indicating in which computational layer the memory error occurred may include a program or instruction counter value, and/or a computational layer identifier associated with the memory error.

At operation 608, the error message can be stored in a notification memory space. For example, the error message can be written to a notification storage memory. In some implementations, the notification storage memory can be external to the memory subsystem that contains the memory error. For example, the error message can be stored or written to an off-chip memory such as a DRAM that is accessible by a host system.

At operation 610, despite the presence of the memory error, execution of the program instructions or program code can be allowed to continue until the current program completes and the computation result is generated. This can be achieved, for example, by suppressing an interrupt associated with the individual memory error to prevent execution of the program instructions or program code from halting due to the memory error.

At operation 612, a confidence level of the computational result is determined. The confidence level can be based on which program instruction resulted in the memory error. For example, the confidence level can be determined by identifying which computational layer corresponds to the program instruction that resulted in the memory error, and determining the confidence level based on the identified computational layer. In some implementations such as a neural network, the confidence level of the computational result can be higher when the identified computational layer is an earlier computational layer than when the identified computational layer is a later computational layer. Referring to the multiple computation layers example described above, this means a memory error occurring in the second computational layer (which has its inputs derived from the outputs of the first computational layer) decreases the confidence level by a greater amount that a memory error occurring in the first computational layer.

In some implementations the confidence level can be further based on what type of information was being stored at the memory location of the memory error. The different types of information may include an instruction, computational data, or a computational weight associated with the computational layer. In such implementations, process 600 may further include identifying the type of information being stored at the memory location based on a memory index associated with the memory error. For example, the memory index can be used to lookup the type of information being stored at the memory location in a memory map or mapping table.

The confidence level of the computational result can be used to determine whether to accept the computational result or to re-execute the program instructions or program code. For example, the confidence level can be compared with a confidence threshold. If the confidence level is below the confidence threshold, a decision can be made to re-execute the program instructions or program code. If the confidence level is at or above the confidence threshold, a decision can be made to accept the computational result, and the system can move on to the next computation. The confidence threshold can be set based on the particular application of the system.

In some implementations, the number of memory errors detected can be counted during execution of the program instructions or program code to obtain a cumulative number of memory errors. In some cases, one or more memory regions can be masked to exclude memory errors in the masked regions from being included in the cumulative number of memory errors. The cumulative number of memory errors can be compared with a predetermined error threshold, and an interrupt can be generated if the number of memory errors during a predetermined time interval is above the predetermined error threshold. This mechanism can be used to alert a host system of a sudden error burst, which may be indicative of a potentially more critical memory or system failure.

Figure 7:
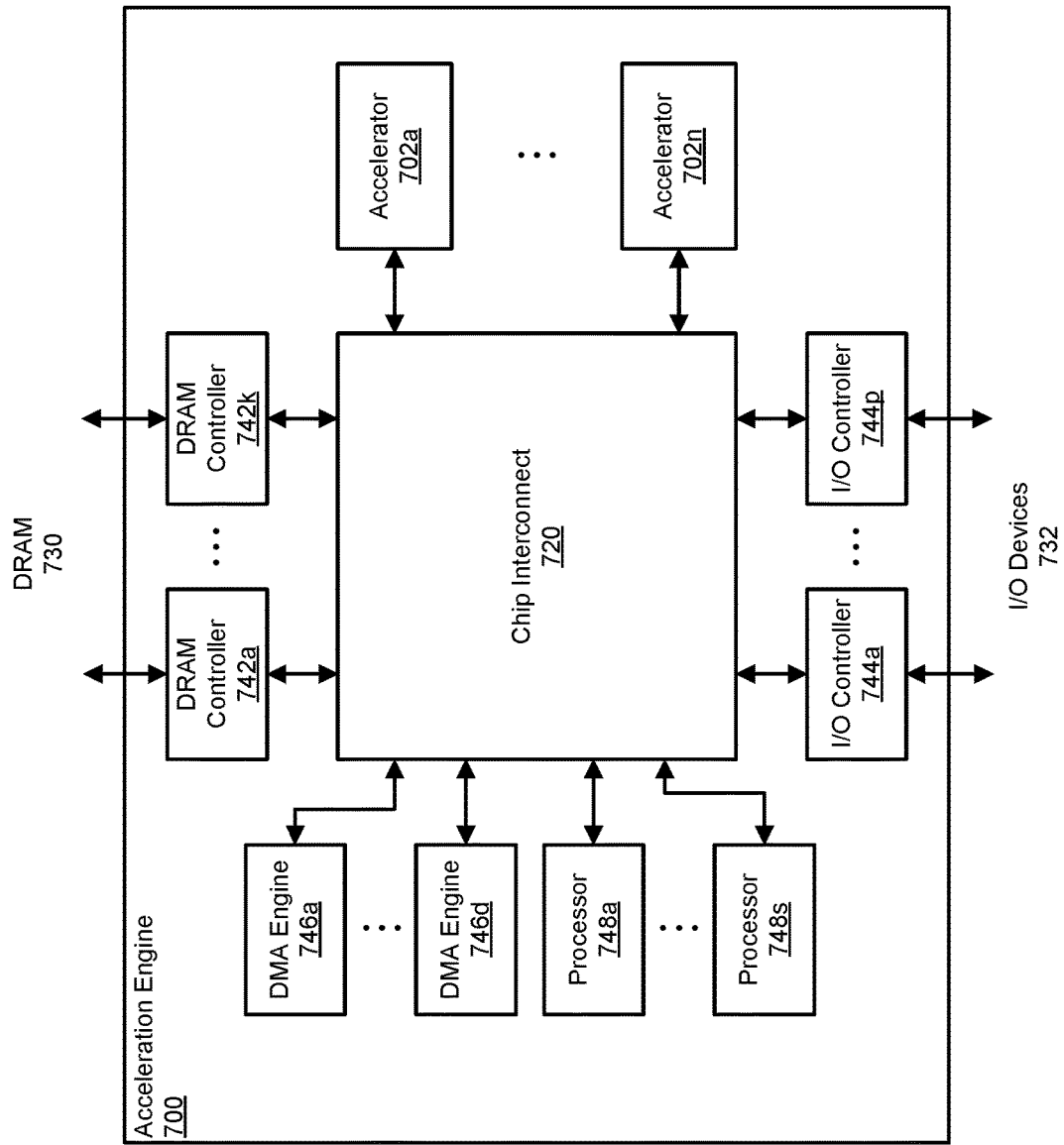
FIG. 7 illustrates a block diagram of an example of an acceleration engine.

FIG. 7 includes a block diagram that illustrates an example of an acceleration engine 700. The acceleration engine 700 is an example of an integrated circuit that can include one or more accelerators 702a-702n that may be similar to the accelerator illustrated in FIG. 2.

In the example of FIG. 7, the acceleration engine 700 includes multiple accelerators 702a-702n, each of which can perform a set of operations. In various examples, the accelerators 702a-702n for particular types of operations, so that the accelerators 702a-702n can perform the operations much faster than when similar operations are performed by a general purpose processor. In various examples, to perform a set of operations, input data on which the operations are to be performed must first be moved into the accelerators 702a-702n. Additionally, in some cases, program code is also moved into the accelerators 702a-702n, which programs the operations that the accelerators 702a-702n will perform on the data. In the illustrated example, the acceleration engine 700 includes n accelerators 702a-702n. Examples of accelerators that can be included in the acceleration engine 700 include graphics accelerators, floating point accelerators, neural network accelerators, and others. In various examples, the accelerators 702a-702n can each be the same (e.g., each of the is a graphics accelerator) or can be different (e.g., the accelerators 702a-702n include a graphics accelerator, a floating point accelerator, and neural network accelerator).

The example acceleration engine 700 further includes DRAM controllers 742a-742k for communicating with an external memory. The external memory is implemented, in this example, using DRAM 730. In the illustrated example, the acceleration engine 700 includes k DRAM controllers 742a-742k, each of which may be able to communicate with an independent set of banks of DRAM. In other examples, other types of RAM technology can be used for the external memory. The DRAM controllers 742a-742k can also be referred to as memory controllers.

In various examples, input data and/or program code for the accelerators 702a-702n can be stored in the DRAM 730. Different programs can cause the accelerators 702a-702n to perform different operations. For example, when one of the accelerators is a neural network accelerator, one program can configure the neural network accelerator to perform speech recognition while another program can configure the neural network accelerator to perform image recognition. In various examples, different accelerators 702a-702n can be programmed with different programs, so that each performs a different set of operations. In various examples, the processors 748a-748s can manage moving of program code from the DRAM 730 to the accelerators 702a-702n.

The example acceleration engine 700 further includes I/O controllers 744a-744p for communicating with I/O devices 732 in the system. The acceleration engine 700 can communicate with I/O devices over, for example, a processor bus. In some examples, the processor bus can be implemented using Peripheral Component Interconnect (PCI) and/or a variation of the PCI bus protocol. The processor bus can connect the acceleration engine 700 to I/O devices such as, for example, input and output devices, memory controllers, storage devices, and/or network interface cards, among other things. In some examples, the I/O controllers 744-744p can enable the acceleration engine 700 to act as an I/O device for a host processor. For example, the acceleration engine 700 can be the recipient of input data from the host processor, and a command indicating an operation to be performed on the input data (e.g., a particular computation or analysis). In the illustrated example, the acceleration engine 700 includes p I/O controllers 744a-744p, each of which may include a separate root complex and may communicate with a separate set of I/O devices 732. In other examples, other standardized bus protocols, such as Ultra Path Interconnect (UPI) can be used for the host bus. In other examples, a proprietary bus protocol can be used.

Movement of data in the acceleration engine 700 can be managed by one or more processors 748a-748s, which can also be referred to as data management processors. In the example of FIG. 7, the acceleration engine 700 includes s processors 748a-748s incorporated into (e.g., on the same silicon die) the device. In other examples, the processors 748a-748s can be external to the acceleration engine 700 (e.g., on a different die and/or in a different package). In some examples, the processors 748a-748s can manage the movement of data from I/O devices 732 to the accelerators 702a-702n or the DRAM 730. For example, input data may be located at an I/O device 732 or in processor memory, and the processors 748a-748s can move the input from the I/O device 732 or processor memory into an accelerator or into DRAM 730. As another example, program code for the accelerators 702a-702n may be located on an I/O device 732 or in processor memory.

The example acceleration engine 700 further includes DMA engines 746a-746d that can move data between the accelerators 702a-702n, DRAM controllers 742a-742k, and I/O controllers 744a-744p. In the illustrated example, the acceleration engine 700 includes d DMA engines 746a-746d. In some implementations, the DMA engines 746a-746d can be assigned to specific tasks, such as moving data from the DRAM controllers 742a-742d to the accelerators 702a-702n, or moving data between the I/O controllers 744a-744p and the accelerators 702a-702n. These tasks can be assigned, for example, by enqueueing descriptors with the DMA engines 746a-746d, where a descriptor identifies an address for a block of data and an operation (e.g., a read or a write) to perform. A descriptor, for example, can direct a DMA engine to instruct a DMA controller to read a block of data from DRAM 730. A descriptor can, as a further example, instruct the DMA engine to write data, read by the DMA controller, to an accelerator. Further descriptors can be used to move data from an accelerator to DRAM 730.

In various examples, each of the processors 748a-748s can be responsible for managing the data movement for a different accelerator. In some examples, a processor may manage the data movement for more than one accelerator. Similarly, in various examples, each of the processors 748a-748s can be assigned to one or more DMA engines 746a-746d. In these and other examples, associations between processors 748a-748s, accelerators 702a-702n, and DMA engines 746a-746d is determined by program code being executed by each respective processor.

In the example acceleration engine 700, the various components can communicate over a chip interconnect 720. The chip interconnect 720 primarily includes wiring for routing data between the components of the acceleration engine 700. In some cases, the chip interconnect 720 can include a minimal amount of logic, such as multiplexors to control the direction of data, flip-flops for handling clock domain crossings, and timing logic.

Figure 8:
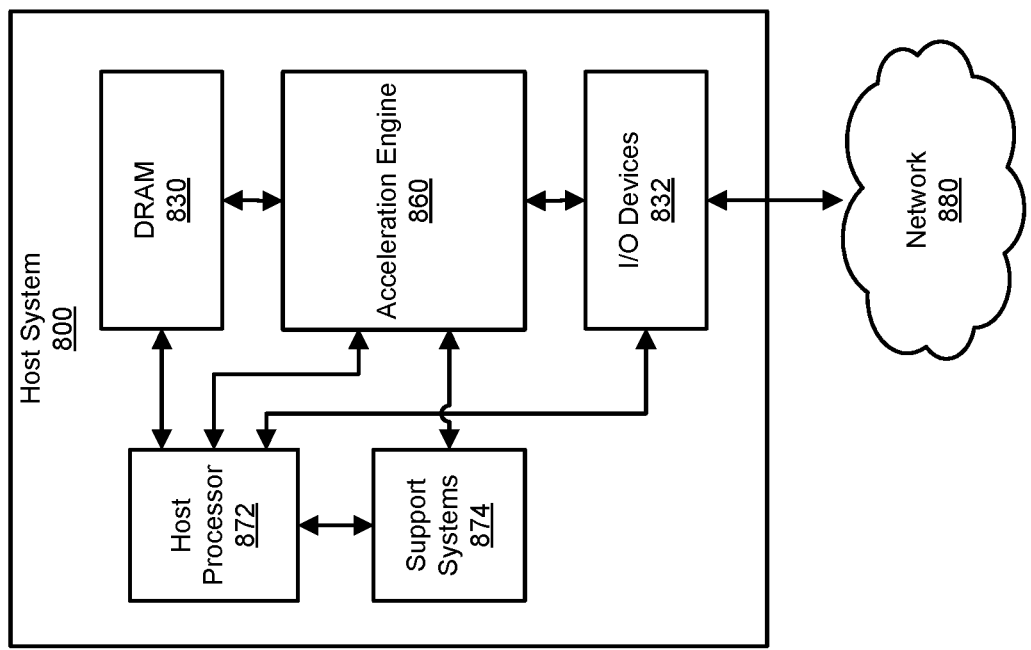
FIG. 8 illustrates a block diagram of an example of a host system.

FIG. 8 includes a block diagram that illustrates an example of a host system 800 in which an acceleration engine 860 can be used. The acceleration engine 860 of FIG. 8 is an example of a device that can include one or more accelerator engines such as is illustrated in FIG. 7. The example host system 800 of FIG. 8 includes the acceleration engine 860, a host processor 872, DRAM 830 or processor memory, I/O devices 832, and support systems 874. In various implementations, the host system 800 can include other hardware that is not illustrated here.

The host processor 872 is a general purpose integrated circuit that is capable of executing program instructions. In some examples, the host processor 872 can include multiple processing cores. A multi-core processor may include multiple processing units within the same processor In some examples, the host system 800 can include more than one host processor 872. In some examples, the host processor 872 and the acceleration engine 860 can be one chip, such as, one or more integrated circuits within the same package.

In various examples, the host processor 872 can communicate with other components in the host system 800 over one or more communication channels. For the example, the host system 800 can include a host processor bus, which the host processor 872 can use to communicate with the DRAM 830, for example. As another example, the host system 800 can include an I/O bus, such as a PCI-based bus, over which the host processor 872 can communicate with the acceleration engine 860 and/or the I/O devices 832, for example. In various examples, the host system 800 can, alternatively or additionally, include other communication channels or busses, such as serial busses, power management busses, storage device busses, and so on.

In some examples, software programs executing on the host processor 872 can receive or generate input for processing by the acceleration engine 860. In some examples, the programs can select an appropriate neural network to execute for a given input. For example, a program may be for language translation, and can select one or more neural networks capable of speech recognition and/or machine translation. In these and other examples, the programs can configure the acceleration engine 860 with the neural network to execute, and/or can select a neural network processing engine on the acceleration engine 860 that has previously been configured to execute the desired neural network. In some examples, once the acceleration engine 860 has started inference on input data, the host processor 872 can manage the movement of data (such as weights, instructions, intermediate results, results of conditional layers, and/or final results) into or out of the acceleration engine 860.

In some examples, a software program that is using the acceleration engine 860 to conduct inference can read the result from a conditional layer from the acceleration engine 860 and/or from a storage location, such as in DRAM 830. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinate by software.

The DRAM 830 is memory that is used by the host processor 872 for storage of program code that the host processor 872 is in the process of executing, as well as values that are being operated on. In some examples, the data for a neural network (e.g., weight values, instructions, and other data) can be all or partially stored in the DRAM 830. DRAM is a common term for processor memory, and though DRAM is volatile memory, processor memory can be volatile and/or non-volatile. Though not illustrated here, the host system 800 can include other volatile and non-volatile memories for other purposes. For example, the host system 800 can include a Read-Only Memory (ROM) that stores boot code for booting the host system 800 at power on, and/or Basic Input/Output System (BIOS) code.

Though not illustrated here, the DRAM 830 can store instructions for various programs, which can be loaded into and be executed by the host processor 872. For example, the DRAM 830 can be storing instructions for an operating system, one or more data stores, one or more application programs, one or more drivers, and/or services for implementing the features disclosed herein.

The operating system can manage and orchestrate the overall operation of the host system 800, such as scheduling tasks, executing applications, and/or controller peripheral devices, among other operations. In some examples, a host system 800 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 800. For example, some drivers can provide communication between the operating system and peripheral devices or I/O devices 832. Alternatively or additionally, some drivers may provide communication between application programs and the operating system, and/or application programs and peripheral devices accessible to the host system 800. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 832 can include hardware for connecting to user input and output devices, such as keyboards, mice, pens, tablets, voice input devices, touch input devices, displays or monitors, speakers, and printers, among other devices The I/O devices 832 can also include storage drives and/or network interfaces for connecting to a network 880. For example, the host system 800 can use a network interface to communicate with storage devices, user terminals, other computing devices or servers, and/or other networks, among various examples.

In various examples, one or more of the I/O devices 832 can be storage devices. In these examples, the storage device include non-volatile memory and can store program instructions and/or data. Examples of storage devices include magnetic storage, optical disks, solid state disks, flash memory, and/or tape storage, among others. The storage device can be housed in the same chassis as the host system 800 or may be in an external enclosure. A storage device can be fixed (e.g., attached by screws) or removable (e.g., having a physical release mechanism and possibly a hot-plug mechanism).

Storage devices, the DRAM 830, and any other memory component in the host system 800 are examples of computer-readable storage media. Computer-readable storage media are physical mediums that are capable of storing data in a format that can be read by a device such as the host processor 872. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. as used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 832 can be PCI-based devices. In these examples, a PCI-based I/O device includes a PCI interface for communicating with the host system 800. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 874 can include hardware for coordinating the operations of the acceleration engine 860. For example, the support systems 874 can include a microprocessor that coordinates the activities of the acceleration engine 860, including moving data around on the acceleration engine 860. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have much more limited capabilities than the host processor 872. In some examples, the program executed by the microprocessor is stored on the hardware of microprocessor, or on a non-volatile memory chip in the host system 800. In some examples, the microprocessor and the acceleration engine 860 can be on chip, such as one integrated circuit on the same die and in the same package.

In some examples, the support systems 874 can be responsible for taking instructions from the host processor 872 when programs executing on the host processor 872 request the execution of a neural network. For example, the host processor 872 can provide the support systems 874 with a set of input data and a task that is to be performed on the set of input data. In this example, the support systems 874 can identify a neural network that can perform the task, and can program the acceleration engine 860 to execute the neural network on the set of input data. In some examples, the support systems 874 only needs to select an appropriate neural network processing engine of the neural network processor. In some examples, the support systems 874 may need to load the data for the neural network onto the acceleration engine 860 before the acceleration engine 860 can start executing the neural network. In these and other examples, the support systems 874 can further receive the output of executing the neural network, and provide the output back to the host processor 872.

In some examples, the operations of the support systems 874 can be handled by the host processor 872. In these examples, the support systems 874 may not be needed and can be omitted from the host system 800.

In various examples, the host system 800 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 800 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

Figure 9:
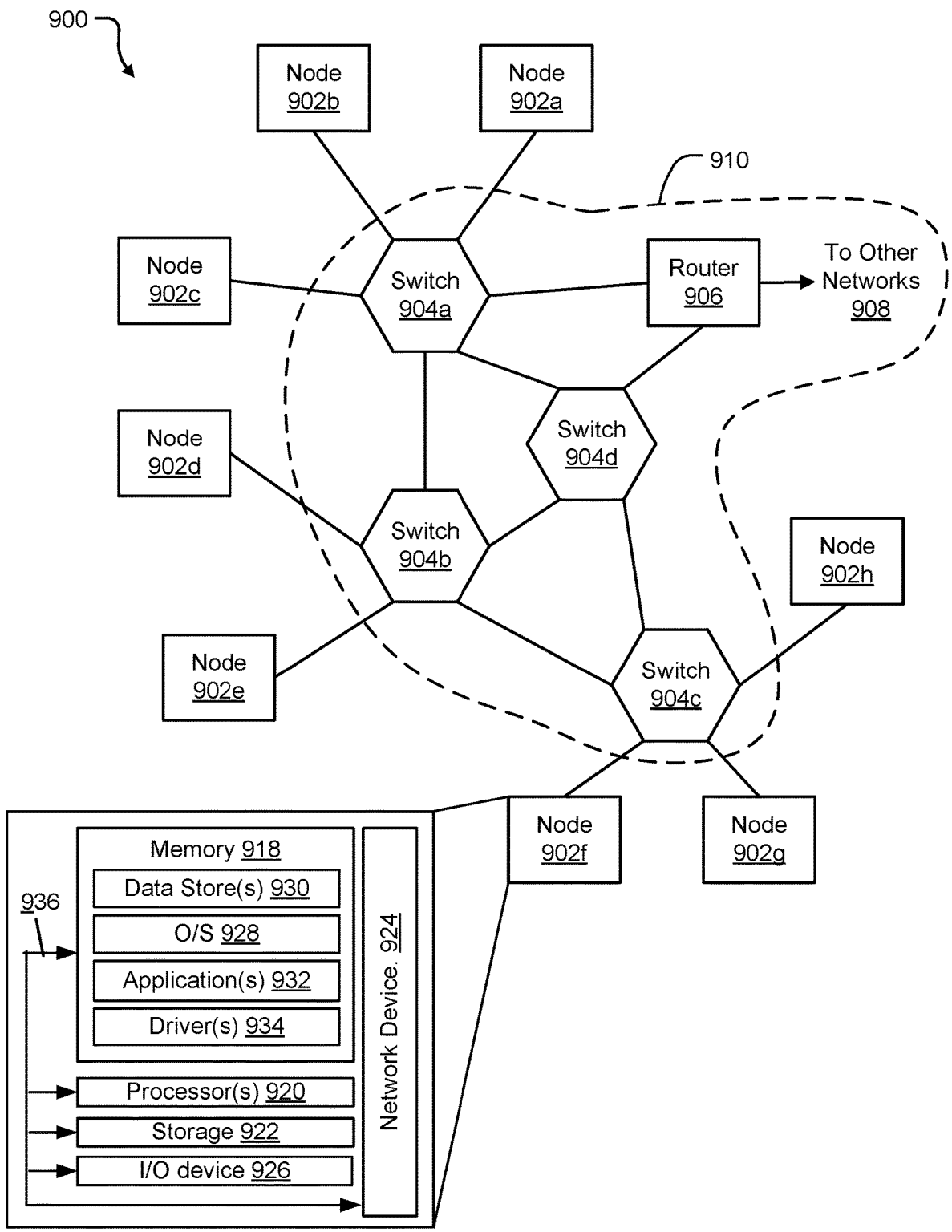
FIG. 9 illustrates an example network.

FIG. 9 includes a diagram of an example network 800, which can include one or more host systems, such as the host system illustrated in FIG. 8. For example, the example network 900 of FIG. 9 includes multiple nodes 902a-902h, one or more of which can be a host system such as is illustrated in FIG. 8. Others of the nodes 902a-902h can be other computing devices, each of which include at least a memory for storing program instructions, a processor for executing the instructions, and a network interface for connecting to the network 900.

In various examples, the network 900 can be used to process data. For example, input data can be received at one of the nodes 902a-902h or from other networks 908 with which the network 900 can communicate. In this example, the input data can be directed to a node in the network 900 that includes an acceleration engine, for the acceleration engine to operate on and produce a result. The result can then be transferred to the node or other network from which the input data was received. In various examples, input data can be accumulated from various sources, including one or more of the nodes 902a-902h and/or computing devices located in the other networks 908, and the accumulated input data can be directed to one or more host systems in the network 900. Results from the host systems can then be distributed back to the sources from which the input data was gathered.

In various examples, one or more of the nodes 902a-902h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 9, the nodes 902a-902h are connected to one another using a switched architecture with point-to point links. The switched architecture includes multiple switches 904a-904d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 904a-904d of FIG. 9 may be connected to the nodes 902a-902h and provide multiple paths between any two nodes.

The network 900 may also include one or more network devices for connection with other networks 908, such as a router 906. Routers use headers and forwarding tables to determine the best path for forwarding the packets, and use protocols such as internet control message protocol (ICMP) to communicate with each other and configure the best route between any two devices. The router 906 of FIG. 9 can be used to connect to other networks 908 such as subnets, LANs, wide area networks (WANs), and/or the Internet.

In some examples, network 900 may include anyone or a combination of many different types of networks, such as cable networks, the Internet, wireless networks, cellular networks and other private and/or public networks. The interconnected switches 904a-904d and the router 906, if present, may be referred to as a switch fabric 910, a fabric, a network fabric, or simply a network. In the context of a computer network, terms "fabric" and "network" may be used interchangeably herein.

The nodes 902a-902h may be any combination of host systems, processor nodes, storage subsystems, and I/O chassis that represent user devices, service provider computers or third party computers.

User devices may include computing devices to access an application 932 (e.g., a web browser or mobile device application). In some aspects, the application 932 may be hosted, managed, and/or provided by a computing resources service or service provider. The application 932 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 908. Additionally, the user device(s) may be part of the distributed system managed by, controlled by, or otherwise part of the service provider computer(s) (e.g., a console device integrated with the service provider computers).

The node(s) of FIG. 9 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 932 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 902a-902h may include at least one memory 918 and one or more processing units (or processor(s) 920). The processor(s) 920 may be implemented in hardware, computer-executable instructions, firmware, or combinations thereof. Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the node(s) 902a-902h, the memory 918 may be volatile (such as RAM) and/or non-volatile (such as ROM, flash memory, etc.). The memory 918 may include an operating system 928, one or more data stores 930, one or more application programs 932, one or more drivers 934, and/or services for implementing the features disclosed herein.

The operating system 928 may support nodes 902a-902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 928 may also be a proprietary operating system.

The data stores 930 may include permanent or transitory data used and/or operated on by the operating system 928, application programs 932, or drivers 934. Examples of such data include web pages, video data, audio data, images, user data, and so on. The information in the data stores 930 may, in some implementations, be provided over the network(s) 908 to user devices. In some cases, the data stores 930 may additionally or alternatively include stored application programs and/or drivers. Alternatively or additionally, the data stores 930 may store standard and/or proprietary software libraries, and/or standard and/or proprietary application user interface (API) libraries. Information stored in the data stores 930 may be machine-readable object code, source code, interpreted code, or intermediate code.

The drivers 934 include programs that may provide communication between components in a node. For example, some drivers 934 may provide communication between the operating system 928 and additional storage 922, network device 924, and/or I/O device 926. Alternatively or additionally, some drivers 934 may provide communication between application programs 932 and the operating system 928, and/or application programs 932 and peripheral devices accessible to the service provider computer. In many cases, the drivers 934 may include drivers that provide well-understood functionality (e.g., printer drivers, display drivers, hard disk drivers, Solid State Device drivers). In other cases, the drivers 934 may provide proprietary or specialized functionality.

The service provider computer(s) or servers may also include additional storage 922, which may include removable storage and/or non-removable storage. The additional storage 922 may include magnetic storage, optical disks, solid state disks, flash memory, and/or tape storage. The additional storage 922 may be housed in the same chassis as the node(s) 902a-902h or may be in an external enclosure. The memory 918 and/or additional storage 922 and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918 and the additional storage 922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 918 and the additional storage 922 are examples of computer storage media. Additional types of computer storage media that may be present in the node(s) 902a-902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 902a-902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 902a-902h may also include I/O device(s) 926, such as a keyboard, a mouse, a pen, a voice input device, a touch input device, a display, speakers, a printer, and the like. The node(s) 902a-902h may also include one or more communication channels 936. A communication channel 936 may provide a medium over which the various components of the node(s) 902a-902h can communicate. The communication channel or channels 936 may take the form of a bus, a ring, a switching fabric, or a network.

The node(s) 902a-902h may also contain network device(s) 924 that allow the node(s) 902a-902h to communicate with a stored database, another computing device or server, user terminals and/or other devices on the network(s) 900.

In some implementations, the network device 924 is a peripheral device, such as a PCI-based device. In these implementations, the network device 924 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 924 may be connected to a computing system using a PCIe interface.

A PCI-based device may include one or more functions. A "function" describes operations that may be provided by the network device 924. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 924 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein maybe software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit device comprising:
   a semiconductor memory;
   a processing circuit configured to execute program code to generate a computational result using a plurality of computational layers;
   an error management circuit configured to:
   detect soft errors in the semiconductor memory during execution of the program code;
   prevent execution of the program code from halting due to the soft errors detected in the semiconductor memory; and
   for each of the soft errors:
   generate an error notification that includes a timestamp, a memory location of the corresponding soft error, and an indication of a computational layer that is being executed when the corresponding soft error occurred; and
write the error notification to a notification storage memory,
wherein a confidence level of the computational result is determined based on which computational layer is being executed when the corresponding soft error occurred; and
an error monitoring circuit configured to:
count the soft errors detected by the error management circuit during a predetermined time interval to generate a count value; and
generate an interrupt when the count value exceeds a predetermined threshold.

2. The integrated circuit device of claim 1, wherein the plurality of computational layers includes a first computational layer that generates computational outputs and a second computational layer having inputs derived from the computational outputs, and wherein an error occurring while the second computational layer is being executed decreases the confidence level by a greater amount than an error occurring while the first computational layer is being executed.

3. The integrated circuit device of claim 1, wherein the confidence level is used to determine whether to accept the computational result or to re-execute the program code.

4. The integrated circuit device of claim 1, wherein the soft errors are detected using a parity check.

5. The integrated circuit device of claim 1, wherein the indication of the computational layer includes at least one of a program counter value or a computational layer identifier.

6. A method for error handling in an integrated circuit device, the method comprising:
executing program instructions to generate a computational result;
detecting a memory error during execution of program instructions;
generating an error message containing information about the memory error;
storing the error message in a notification memory space;
allowing execution of the program instructions to continue with the memory error; and
determining a confidence level of the computational result based on which program instruction resulted in the memory error.

7. The method of claim 6, wherein the computational result is generated by a series of computational stages, and wherein determining the confidence level includes:
identifying which computational stage corresponds to the program instruction that resulted in the memory error; and
determining the confidence level based on the identified computational stage.

8. The method of claim 7, wherein the series of computational stages includes a first computational stage that is executed before a second computational stage, and wherein the confidence level of the computational result is higher when the identified computational stage is the first computational stage than when the identified computational stage is the second computational stage.

9. The method of claim 6, wherein the error message includes a timestamp, a memory index associated with a memory location of the memory error, and a program counter value associated with the memory error.

10. The method of claim 9, further comprising:
identifying a type of information being stored at the memory location based on the memory index, wherein the confidence level is further based on the type of information being stored at the memory location.

11. The method of claim 7, further comprising:
generating an interrupt when a cumulative number of memory errors detected during execution of the program instructions exceeds an error threshold.

12. The method of claim 11, further comprising:
masking a memory region to exclude a memory error in the masked memory region from being included in the cumulative number of memory errors.

13. The method of claim 7, wherein the memory error is detected using a parity check.

14. The method of claim 7, wherein the memory error is an uncorrectable error detected using an error correction code.

15. A computing device comprising:
a processing unit including a processor circuit and a memory subsystem, the processor circuit configured to execute instructions to perform computations using multiple computational layers to generate a computational output; and
an error management circuit configured to:
detect a memory error during execution of the instructions;
generate an error notification containing information indicating which computational layer the memory error occurred in; and
allow execution of the instructions to continue with the memory error,
wherein a confidence level of the computational output is determined based on the computational layer that is being executed when the memory error occurred.

16. The computing device of claim 15, wherein the processor circuit is further configured to re-execute the instructions when the confidence level is below a confidence threshold.

17. The computing device of claim 15, wherein the error notification further contains information indicating a memory location of the memory error.

18. The computing device of claim 17, wherein the confidence level is further based on whether a type of information being stored at the memory location is an instruction, computational data, or a computational weight associated with the computational layer.

19. The computing device of claim 15, wherein the error management circuit is configured to allow execution of the instructions to continue by suppressing an interrupt associated with the memory error.

20. The computing device of claim 15, wherein the error notification is stored in a memory external to the memory subsystem.

* * * * *